US012726848B2

(12) United States Patent
Liu et al.

(10) Patent No.: US 12,726,848 B2
(45) Date of Patent: Sep. 1, 2026

(54) CONFIGURATION METHOD IN SIDELINK RELAY ARCHITECTURE AND DEVICE

(71) Applicant: VIVO MOBILE COMMUNICATION CO., LTD., Guangdong (CN)

(72) Inventors: Jiamin Liu, Guangdong (CN); Yang Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 558 days.

(21) Appl. No.: 17/980,357

(22) Filed: Nov. 3, 2022

(65) Prior Publication Data

US 2023/0046436 A1 Feb. 16, 2023

Related U.S. Application Data

(63) Continuation of application No. PCT/CN2021/092662, filed on May 10, 2021.

(30) Foreign Application Priority Data

May 12, 2020 (CN) ......................... 202010398670.9

(51) Int. Cl.
*H04W 28/02* (2009.01)
*H04W 88/04* (2009.01)

(52) U.S. Cl.
CPC ... *H04W 28/0268* (2013.01); *H04W 28/0263* (2013.01); *H04W 88/04* (2013.01)

(58) Field of Classification Search
CPC ......... H04W 28/0268; H04W 28/0263; H04W 88/04; H04W 92/10; H04W 92/18; H04W 24/02; H04W 28/02; H04W 76/14
See application file for complete search history.

(56) References Cited

U.S. PATENT DOCUMENTS

| | | | | |
|---|---|---|---|---|
| 10,383,035 | B2 * | 8/2019 | Sheng | H04W 48/08 |
| 12,273,871 | B2 * | 4/2025 | Wang | H04W 40/22 |
| 2018/0092027 | A1 | 3/2018 | Sheng | |

(Continued)

FOREIGN PATENT DOCUMENTS

| | | | |
|---|---|---|---|
| CN | 106162512 | A | 11/2016 |
| CN | 107889080 | A | 4/2018 |

(Continued)

OTHER PUBLICATIONS

First Office Action for Indian Application No. 202227067959, dated Feb. 8, 2023, 6 Pages.

(Continued)

*Primary Examiner* — Khaled M Kassim
*Assistant Examiner* — Christopher A. Reyes
(74) *Attorney, Agent, or Firm* — BROOKS KUSHMAN P.C.

(57) ABSTRACT

A configuration method for a sidelink relay architecture and a device are disclosed. The method is executed by a relay terminal, and includes: receiving configuration information, where the configuration information is used for configuring a mapping relationship between a universal user network interface Uu bearer and at least one of the following of a remote terminal: a sidelink bearer or quality of service QoS flow information, and the Uu bearer is a bearer between the relay terminal and a network device.

18 Claims, 4 Drawing Sheets

(56) References Cited

U.S. PATENT DOCUMENTS

| | | | | |
|---|---|---|---|---|
| 2018/0092112 | A1* | 3/2018 | Jung | H04W 72/566 |
| 2018/0124621 | A1* | 5/2018 | Jung | H04W 72/0453 |
| 2018/0132161 | A1* | 5/2018 | Lee | H04W 36/30 |
| 2018/0139681 | A1* | 5/2018 | Jung | H04W 56/0015 |
| 2018/0152986 | A1* | 5/2018 | Jung | H04W 76/27 |
| 2018/0249516 | A1* | 8/2018 | Jung | H04W 76/11 |
| 2018/0255499 | A1* | 9/2018 | Loehr | H04W 40/22 |
| 2019/0238407 | A1* | 8/2019 | Papa | H04W 24/10 |
| 2019/0261450 | A1* | 8/2019 | Adachi | H04W 76/11 |
| 2019/0319840 | A1* | 10/2019 | Cheng | H04L 41/147 |
| 2019/0327621 | A1* | 10/2019 | Chou | H04W 24/02 |
| 2019/0349722 | A1* | 11/2019 | Lee | H04W 4/16 |
| 2019/0357280 | A1 | 11/2019 | Lee et al. | |
| 2019/0364492 | A1* | 11/2019 | Azizi | H04W 4/024 |
| 2020/0059896 | A1* | 2/2020 | Xu | H04W 28/02 |
| 2020/0059915 | A1* | 2/2020 | Lee | H04W 72/20 |
| 2020/0077253 | A1* | 3/2020 | Kim | H04W 76/30 |
| 2020/0107218 | A1* | 4/2020 | Wang | H04W 36/18 |
| 2023/0046436 | A1* | 2/2023 | Liu | H04W 28/02 |
| 2023/0063139 | A1 | 3/2023 | Du | |
| 2023/0067851 | A1* | 3/2023 | Zeng | H04W 28/0268 |

FOREIGN PATENT DOCUMENTS

| | | | |
|---|---|---|---|
| CN | 108307472 | A | 7/2018 |
| CN | 108391285 | A | 8/2018 |
| JP | 2023514265 | A | 4/2023 |
| WO | 2018016882 | A1 | 1/2018 |
| WO | 2018143763 | A1 | 8/2018 |
| WO | 2021160105 | A1 | 8/2021 |

OTHER PUBLICATIONS

International Search Report and Written Opinion for Application No. PCT /CN2021/092662, dated Jul. 21, 2021, 6 Pages.

Extended European Search Report for Application No. 21803287.8, dated Oct. 9, 2023, 12 Pages.

3GPP "3rd Generation Partnership Project; Technical Specification Group Radio Access Network; Study on further enhancement to LTE Device to Device (D2D), User Equipment (UE) to network relays for Internet of Things (IoT) and wearables; (Release 15)" 3GPP TR 36.746 V15.1.1 (Apr. 2018), 2018, 55 Pages.

Coolpad "Discussion on Signaling Radio Bearer Modelling for L2 Relay UE" 3GPP TSG RAN WG2 Meeting #98, Hangzhou, China, May 2017, R2-1704553, 4 Pages.

Intel Corporation "Characteristics of L2 and L3-based Sidelink Relaying" 3GPP TSG-RAN WG2 Meetin #111e, E-meeting, Aug. 2020, R2-2006718, 23 Pages.

Second Office Action for Japnese Application No. 2022-568531, dated Mar. 18, 2024, 8 Pages.

OPPO. Connection establishment via Layer 2 UE-to-Network relay. 3GPP TSG RAN 2 Meeting 98. R2 1704045. Online. May 2017. 5 pages.

LG. Report of [103bis#38] SL unicast/groupcast (LG). 3GPP TSG RAN WG2 #104. R2 1818496. Online. Nov. 2018. 20 pages.

Huawei, Hisilicon. ProSe Priority determination of unicast and eMBMS traffic. 3GPP TSG SA WG2 Meeting #110AH. S2-152802. Online. Aug.-Sep. 9 pages.

Kyocera. Consideration of bearer mapping for ProSe UE-to-Network Relays. 3GPP TSG-RAN WG2 #91bis. R2-154678. Online. Oct. 2015. 7 pages.

3rd Generation Partnership Project. Technical Specification Group Services and System Aspects; Study on system enhancement for Proximity based Services (ProSe) in the 5G System (5GS) (Release 17). 3GPP TR 23.752 V0.3.0. Online. Jan. 2020. 72 pages.

3rd Generation Partnership Project. Technical Specification Group Radio Access Network; NR; NR and NG-RAN Overall Description; Stage 2 (Release 16). 3GPP TS 38.300 V16.1.0. Online. Mar. 2020. 129 pages.

3rd Generation Partnership Project. Technical Specification Group Radio Access Network; NR; Radio Resource Control (RRC) protocol specification (Release 16). 3GPP TS 38.331 V16.0.0. Online. Mar. 2020. 836 pages.

First Korean Office Action for Korean Patent Application No. 10-2022-7042924 dated Mar. 18, 2025. 14 pages.

* cited by examiner

100

Receive configuration information, where the configuration information is used for configuring a mapping relationship between a Uu bearer and at least one of the following of a remote terminal: a sidelink bearer and QoS flow information, and the Uu bearer is a bearer between a relay terminal and a network device

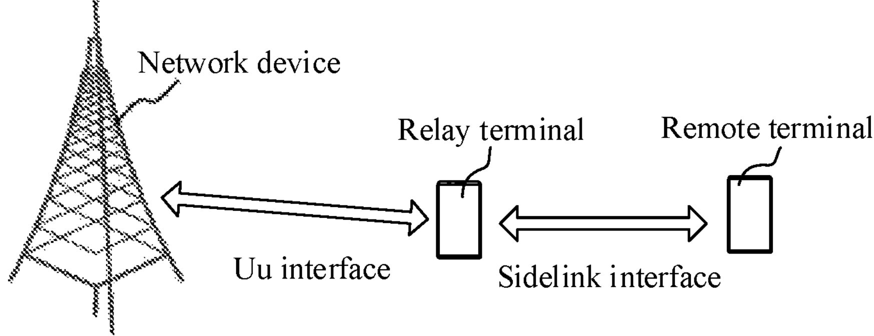

Send configuration information, where the configuration information is used for configuring, for a relay terminal, a mapping relationship between a Uu bearer and at least one of the following of a remote terminal: a sidelink bearer and QoS flow information, and the Uu bearer is a bearer between the relay terminal and a network device

400
Send QoS information, where the QoS information is used for configuring, for a relay terminal by a network device, a mapping relationship between a Uu bearer and at least one of the following: a sidelink bearer and QoS flow information, and the Uu bearer is a bearer between the relay terminal and the network device
S402
FIG. 4
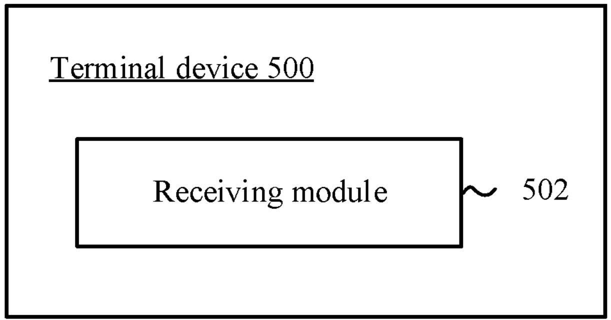
FIG. 5
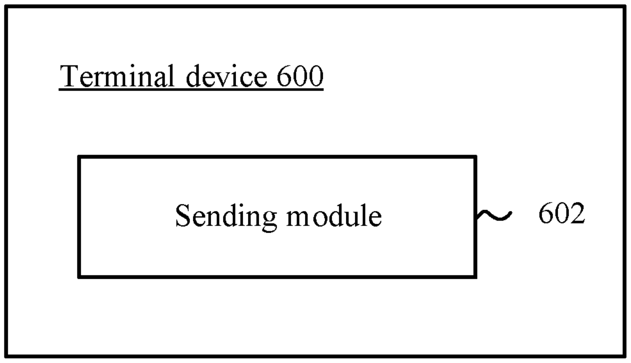
FIG. 6

CONFIGURATION METHOD IN SIDELINK RELAY ARCHITECTURE AND DEVICE

CROSS-REFERENCE TO RELATED APPLICATIONS

This application is a continuation of PCT International Application No. PCT/CN2021/092662 filed on May 10, 2021, which claims priority to Chinese Patent Application No. 202010398670.9 filed on May 12, 2020, which are incorporated herein by reference in their entireties.

TECHNICAL FIELD

Embodiments of this application relate to the communications field, and in particular, to a configuration method in a sidelink relay architecture and a device.

BACKGROUND

Sidelink has been supported by the long term evolution (LTE) system since the 12th release, and is used for direct data transmission between terminal devices without through a network device.

With the development of sidelink, a sidelink relay architecture is proposed in related technologies. In a typical sidelink relay architecture, a relay terminal (relay UE) forwards data of a remote terminal (remote UE) to a network device through a sidelink link (or referred to as a relay link) between the remote terminal and the relay terminal. In the sidelink relay architecture, the relay terminal plays a role of data forwarding during data transmission between the remote terminal and the network device.

In the sidelink relay architecture, how to configure a clear bearer mapping for the relay terminal to make the relay terminal serve the remote terminal is a technical problem that needs to be solved urgently in the related art.

SUMMARY

According to a first aspect, a configuration method for a sidelink relay architecture is provided, the method is performed by a relay terminal, and the method includes: receiving configuration information, where the configuration information is used for configuring a mapping relationship between a universal user network interface (User to Network interface universal, Uu) bearer and at least one of the following of a remote terminal: a sidelink bearer or quality of service (QoS) flow information, and the Uu bearer is a bearer between the relay terminal and a network device.

According to a second aspect, a configuration method for a sidelink relay architecture is provided, the method is performed by a network device, and the method includes: sending configuration information, where the configuration information is used for configuring, for a relay terminal, a mapping relationship between a Uu bearer and at least one of the following of a remote terminal: a sidelink bearer or QoS flow information, and the Uu bearer is a bearer between the relay terminal and the network device.

According to a third aspect, a configuration method for a sidelink relay architecture is provided, the method is performed by a remote terminal, and the method includes: sending QoS information, where the QoS information is used for configuring, for a relay terminal by a network device, a mapping relationship between a Uu bearer and at least one of the following: a sidelink bearer or QoS flow information, and the Uu bearer is a bearer between the relay terminal and the network device.

According to a fourth aspect, a relay terminal is provided, including: a receiving module, configured to receive configuration information, where the configuration information is used for configuring a mapping relationship between a Uu bearer and at least one of the following of a remote terminal: a sidelink bearer or QoS flow information, and the Uu bearer is a bearer between the relay terminal and a network device.

According to a fifth aspect, a network device is provided, including: a sending module, configured to send configuration information, where the configuration information is used for configuring, for a relay terminal, a mapping relationship between a Uu bearer and at least one of the following of a remote terminal: a sidelink bearer or QoS flow information, and the Uu bearer is a bearer between the relay terminal and the network device.

According to a sixth aspect, a remote terminal is provided, including: a sending module, configured to send QoS information, where the QoS information is used for configuring, for a relay terminal by a network device, a mapping relationship between a Uu bearer and at least one of the following: a sidelink bearer or QoS flow information, and the Uu bearer is a bearer between the relay terminal and the network device.

According to a seventh aspect, a terminal device is provided, and the terminal device includes a processor, a memory, and an instruction or a program stored in the memory and capable of running on the processor, where when the instruction or the program is executed by the processor, the configuration method for the sidelink relay architecture according to any one of the first aspect and the third aspect is implemented.

According to an eighth aspect, a network device is provided, and the network device includes a processor, a memory, and an instruction or a program stored in the memory and capable of running on the processor, where when the instruction or the program is executed by the processor, the configuration method for the sidelink relay architecture according to the second aspect is implemented.

According to a ninth aspect, a readable storage medium is provided, where the readable storage medium stores an instruction or a program, and when the instruction or the program is executed by a processor, the configuration method for the sidelink relay architecture according to any one of the first aspect to the third aspect is implemented.

According to a tenth aspect, an embodiment of this application provides a chip, where the chip includes a processor and a communications interface, the communications interface is coupled to the processor, and the processor is configured to run a program or an instruction to implement the configuration method for the sidelink relay architecture according to any one of the first aspect to the third aspect.

BRIEF DESCRIPTION OF DRAWINGS

FIG. 1 is a schematic flowchart of a configuration method for a sidelink relay architecture according to an embodiment of this application;

FIG. 2 is a schematic diagram of a sidelink relay architecture according to an embodiment of this application;

FIG. 3 is a schematic flowchart of a configuration method for a sidelink relay architecture according to another embodiment of this application;

FIG. 4 is a schematic flowchart of a configuration method for a sidelink relay architecture according to still another embodiment of this application;

FIG. 5 is a schematic structural diagram of a terminal device according to an embodiment of this application;

FIG. 6 is a schematic structural diagram of a terminal device according to another embodiment of this application;

DETAILED DESCRIPTION

Figure 7:
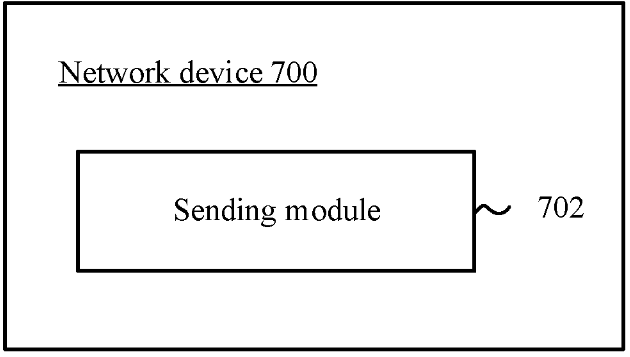
FIG. 7 is a schematic structural diagram of a network device according to an embodiment of this application.

To make the objectives, technical solutions, and advantages of this application clearer, the following clearly describes the technical solutions in the embodiments of this application with reference to the accompanying drawings in the embodiments of this application. Obviously, the described embodiments are merely some but not all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

It should be understood that the technical solutions of the embodiments of this application can be applied to various communications systems, for example, an LTE sidelink system, an NR sidelink system, or a later evolved sidelink communications system.

In the embodiments of this application, a terminal device may include but is not limited to a mobile station (MS), a mobile terminal, a mobile phone (Mobile Telephone), user equipment (UE), a handset, a portable equipment, and a vehicle (vehicle). The terminal device may communicate with one or more core networks by using a radio access network (RAN). For example, the terminal device may be a mobile phone (also referred to as a "cellular" phone), or a computer having a wireless communication function; or the terminal device may be a portable, pocket-sized, handheld, computer built-in, or in-vehicle mobile apparatus.

In the embodiments of this application, a network device is an apparatus deployed in a radio access network and configured to provide a wireless communication function for terminal devices. The network device may be a base station, and the base station may include forms of a macro base station, a micro base station, a relay station, an access point, and the like. Names of devices having functions of the base station may vary with systems using different radio access technologies. For example, the base station is referred to as an evolved NodeB (eNB or eNodeB) in an LTE network, or referred to as an Node B in a third generation (3rd Generation, 3G) network, or referred to as a next generation node B (gNB) in a 5G system, or a network device in a later evolved communications system. The terms in use do not constitute any limitation.

As shown in FIG. 1, an embodiment of this application provides a configuration method 100 in a sidelink relay architecture, and the method may be executed by a relay terminal (relay UE). In other words, the method may be executed by software or hardware installed in the relay terminal. The method 100 includes the following step.

S102: Receive configuration information, where the configuration information is used for configuring a mapping relationship between a Uu bearer and at least one of the following of a remote terminal (remote UE): a sidelink bearer or QoS flow information, and the Uu bearer is a bearer between the relay terminal and a network device.

As shown in FIG. 2, FIG. 2 is a schematic diagram of the sidelink relay architecture. Under such architecture, the relay terminal plays a role of data forwarding, and can forward, to the network device, data coming from the remote terminal, or forward, to the remote terminal, data coming from the network device.

The configuration information described in this embodiment comes from the network device to which the relay terminal belongs, and the configuration information may be used for configuring a mapping relationship between the sidelink bearer and the Uu bearer, or used for configuring a mapping relationship between the QoS flow information and the Uu bearer, or used for configuring both a mapping relationship between the sidelink bearer and the Uu bearer and a mapping relationship between the QoS flow information and the Uu bearer.

In this embodiment, the Uu bearer is a bearer between the relay terminal and the network device, and the Uu bearer may be a Uu dedicated radio bearer (DRB), or may be a Uu radio link control (RLC) bearer.

In this embodiment, the sidelink bearer may be a sidelink radio bearer (SLRB), or may be a sidelink RLC bearer.

According to the configuration method for the sidelink relay architecture in this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

In an actual application process, the embodiment 100 may be implemented by using a radio resource control (RRC) reconfiguration procedure, and the configuration information described in the embodiment 100 may be RRC reconfiguration signaling. In the RRC reconfiguration signaling, a new Uu bearer may be added (for example, a DRB is added) or an original Uu bearer is replaced (for example, an original DRB is replaced) to map the QoS flow information and/or sidelink bearer of the remote terminal to the Uu bearer, and a new/replaced configuration parameter is configured for the Uu bearer.

In a sidelink layer 3 (L3) relay architecture, the configuration parameter includes, for example, a service data adaptation protocol (SDAP) configuration parameter (including a mapping relationship), a packet data convergence protocol (PDCP) configuration parameter, an RLC configuration parameter, and media access control (MAC) configuration parameter.

In a sidelink layer 2 (L2) relay architecture, because data of the remote terminal has only an RLC bearer configuration on a Uu interface, the configuration parameter may include only an RLC configuration parameter and a MAC configuration parameter.

The configuration information in the embodiment 100 is specifically used for configuring the mapping relationship between the QoS flow information of the remote terminal and the Uu bearer, and/or configuring the mapping relationship between the sidelink bearer (for example, an SLRB or a sidelink RLC bearer) of the remote terminal to the Uu bearer, depending on different sidelink architectures.

In the L3 architecture, two links (the sidelink and the Uu link) have their own L3 protocols, the relay terminal processes an IP data packet of the remote terminal, and the relay terminal may obtain QoS flow information of data. Therefore, the mapping relationship between the QoS flow information of the remote terminal and the Uu bearer (for example, a DRB or a Uu RLC bearer) can be configured by using the configuration information.

However, in the L2 architecture, the L3 protocol is located in an end-to-end node between the remote terminal and the network device, and the relay terminal can forward only a PDCP protocol data unit (PDU) data packet of the remote terminal (the PDCP PDU data packet is based on an SLRB granularity) and cannot distinguish different QoS flow information (that is, a QoS flow index). Therefore, the mapping relationship between the sidelink bearer (for example, an SLRB) of the remote terminal and the Uu bearer (for example, a DRB or a Uu RLC bearer) can be configured by using the configuration information.

The following describes the mapping relationship mentioned in the embodiment 100 by using examples. It is assumed that a remote UE1 has data with five pieces of QoS flow information (hereinafter referred to as QoS flow) to be sent. A QoS flow 1 and a QoS flow 2 have similar QoS requirements and are mapped to a same SLRB1 for PC5 link transmission. A QoS flow 3, a QoS flow 4, and a QoS flow 5 have similar QoS requirements, and are mapped to a same SLRB2 for PC5 link transmission. On a Uu link of the relay UE, a DRB 8 and a DRB 9 may be used to carry the two types of services of the remote UE1, respectively, with the following mapping configurations:

Mapping manner 1: mapping the QoS flow 1 and the QoS flow 2 of the remote UE1 to the DRB 8 for Uu transmission, and mapping the QoS flow 3, the QoS flow 4, and the QoS flow 5 of the remote UE1 to the DRB 9 for Uu transmission.

Mapping manner 2: mapping the SLRB1 of the remote UE1 to the DRB 8 for Uu transmission, and mapping the SLRB2 of the remote UE1 to the DRB 9 for Uu transmission.

A simple example is given in table 1 below to specifically describe the foregoing mapping configurations.

TABLE 1

Mapping relationship between QoS flows or SLRBs and DRBs

| Remote terminal 1 | Sidelink | Relay terminal | Uu link | Network device |
|---|---|---|---|---|
| QoS flow 1 | SLRB 1 | Mapping | Uu DRB 8 | |
| QoS flow 2 | | SLRB/QoS flow to | | |
| QoS flow 3 | SLRB 2 | DRB | | |
| QoS flow 4 | | | Uu DRB 9 | |
| QoS flow 5 | | | | |

In an actual mapping configuration, the mapping relationship may be more complex, with more flexible configurations. For example, two or more SLRBs (or QoS flow information belonging to two SLRBs) of one remote terminal may be mapped to one Uu DRB, or a plurality of SLRBs of a plurality of remote terminals are mapped to one Uu DRB, so as to reduce the number of Uu DRBs of the relay terminal and reduce user-plane header overheads.

Based on the mapping relationship configured by using the configuration information, the relay terminal can clearly know how to transmit the data of the remote terminal on the Uu interface.

Optionally, the embodiment 100 may further include the steps of receiving QoS information from the remote terminal; and sending the QoS information to the network device, where the QoS information is used for configuring the Uu bearer for the relay terminal by the network device.

It should be noted that the QoS flow information described in the embodiments of this application may be an index (ID) of a QoS flow, and the QoS information described in the embodiments of this application may be some more detailed information, for example, including a service type, a service data delay, a block error rate, a priority, and the like.

In the actual application process, when requesting the relay terminal for a relay function connection, the remote terminal may send detailed service information (QoS information) to the relay terminal, so that the relay terminal determines whether to provide a relay function for a corresponding service. This process may be completed by performing a PC5-S signaling procedure or by performing a PC5-RRC signaling procedure.

In other words, the relay terminal also has all detailed service QoS information for requesting the relay function by the remote terminal, and the relay terminal may report the service QoS information to the network device, so that the network device can configure a corresponding bearer (for example, a Uu bearer or a sidelink bearer) and a mapping manner (for example, the mapping relationship described in the embodiment 100).

The sending the QoS information to the network device is implemented in the following two manners:

Manner 1: Sending the QoS information to the network device by using newly defined RRC signaling, where the newly defined RRC signaling is used to indicate that the QoS information corresponds to a service of the remote terminal. For example, the newly defined RRC signaling is different from signaling for reporting sidelink information by the relay terminal itself, and therefore the network device can clearly know that the service QoS information reported by using the newly defined RRC signaling is for a service of the remote terminal to be forwarded by the relay terminal, but not for a service of the relay terminal itself.

Manner 2: Sending the QoS information to the network device by using existing RRC signaling, where the existing RRC signaling includes indication information, and the indication information is used to indicate that the QoS information corresponds to a service of the remote terminal. For example, the QoS information may be carried in sidelink UE information signaling of the relay terminal itself, but a separate field or a clear identifier is required to identify a service request of the remote terminal, but not a sidelink service request of the relay terminal itself.

Optionally, the embodiment 100 may further include the steps of receiving sidelink bearer information from the remote terminal; and sending the sidelink bearer information to the network device, where the sidelink bearer information is used for configuring the Uu bearer for the relay terminal by the network device.

In some cases, the remote terminal may obtain, based on information from the network side, sidelink bearer information of a PC5 link corresponding to its own service QoS. For example, the remote terminal has obtained the sidelink bearer information (such as an SLRB bearer configuration) from system information block (System Information Block, SIB) information, preconfigured information, or its own RRC signaling, and may alternatively send the sidelink bearer information to the relay terminal by using a PC5-RRC signaling procedure, because the relay terminal is another endpoint of the PC5 interface.

The relay terminal obtains the sidelink bearer information (for example, the SLRB bearer configuration) that has been configured for the remote terminal, and may send the sidelink bearer information to its own network device, so that the network device can configure a corresponding Uu bearer for the relay terminal and configure the mapping relationship between the sidelink bearer and/or QoS flow information and the Uu bearer by using the configuration information in the embodiment 100. In the mapping relationship, the SLRB being in an acknowledged mode (AM) may be mapped to an Uu bearer also with an AM configuration, instead of being mapped to an Uu bearer in an unacknowledged mode (UM).

The foregoing embodiments describe configuration for mapping between the PC5 link and the Uu bearer for data of the remote terminal. Mapping from the sidelink bearer and/or QoS flow information to the Uu bearer may be both considered as mapping between pipelines. There are mainly two mapping manners.

Manner 1: one-to-one mapping between a PC5 pipeline and a Uu pipeline, that is, one sidelink bearer on the PC5 link is surely mapped to one Uu bearer on the Uu link. In addition, the mapping is unique, that is, only data carried by this sidelink is transmitted on the Uu bearer.

Advantages of manner 1 lie in that data of different remote terminals can be distinguished, and the mapping relationship is unique and clear. However, this manner may impose relatively high requirements on the number of Uu bearers (such as DRBs). An ordinary relay terminal has a maximum of 16 or 32 DRBs. If a large number of remote terminals are connected to the relay terminal, 16 or 32 DRBs need to be reserved for each remote terminal.

Manner 2: many-to-one mapping between the PC5 pipe and the Uu pipe, where a plurality of sidelink bearers are mapped to one Uu bearer, that is, a plurality of sidelink bearers with similar QoS requirements may be mapped to one Uu bearer. The plurality of sidelink bearers may belong to a plurality of remote terminals or one remote terminal.

Advantages of manner 2 lie in that the number of Uu bearers (for example, DRBs) can be reduced to control user-plane header overheads. Specifically, for example, a logical channel identifier (LCD) is extended along with an increase in the number of DRBs. For Uu data of one relay terminal, the maximum number of pieces of DRB data is 16 or 32, and a 6-bit LCID is enough. However, considering access of the plurality of remote terminals, the LCID needs to be extended to 8 bits or 16 bits, resulting in an increase in header overheads because the LCID is carried in a MAC PDU.

Based on descriptions of the foregoing manner 1 and manner 2, optionally, in the embodiment 100, in a case that the configuration information is used for configuring a mapping relationship between the sidelink bearer and the Uu bearer, N sidelink bearers are mapped to one Uu bearer, where N is an integer greater than or equal to 1.

Optionally, in the embodiment 100, in a case that the configuration information is used for configuring a mapping relationship between the QoS flow information and the Uu bearer, M pieces of QoS flow information are mapped to one Uu bearer, where M is an integer greater than or equal to 1.

It can be understood that there is no conflict between the foregoing two embodiments, and therefore the foregoing two embodiments can be implemented simultaneously.

In a scenario with a many-to-one mapping between the PC5 pipeline and the Uu pipeline described in the foregoing manner 2, it may need to distinguish data of different remote terminals or data carried on different sidelinks. The following describes specific solutions:

Solution 1: distinguishing by using an existing field

For example, in the L3 architecture, a data packet that the relay terminal can obtain and process is an IP data packet of the remote terminal, and the IP data packets carries an IP address. Such IP address is allocated per remote terminal; in other words, the relay terminal can know a correspondence between an IP address and a remote terminal. Then, for data from the Uu link, the remote terminal may know, by reading an IP address of the data, a remote terminal the data belongs to, and also knows which remote terminal the data is to be sent to, so as to send the data on a sidelink bearer of the remote terminal. In another case, if a remote terminal has different data to be distinguished, a differentiated services code point (DSCP) field in the IP data packet may be used for distinguishing. For example, a data packet 1 of the remote terminal 1 being parsed from one DRB has a DSCP value of x, and then is mapped to an SLRB1 of the remote terminal 1; and a data packet 2 of the remote terminal 1 being parsed has a DSCP value of y, and then is mapped to an SLRB2 of the remote terminal 1.

Based on description of the solution 1, optionally, the IP data packet transmitted on the Uu bearer includes an IP address, and the IP address has a correspondence to the remote terminal. In this way, the embodiment 100 may further include the following step: The relay terminal maps, based on the IP address in the IP data packet, the IP data packet transmitted on the Uu bearer to a sidelink bearer (of a remote terminal) corresponding to the IP address in the IP data packet, for transmission.

It can be understood that a relatively large quantity of IP data packets are transmitted on the Uu bearer, and for each IP data packet in the plurality of IP data packets, mapping and transmission can be performed in the foregoing manner.

Based on the description of solution 1, optionally, the IP data packet transmitted on the Uu bearer includes a DSCP field, and a plurality of values of the DSCP field respectively correspond to a plurality of pieces of data with different QoS information, and the plurality of pieces of data with different QoS information belong to one or more remote terminals. In this way, the embodiment 100 may further include the following step: The relay terminal maps, based on the plurality of values of the DSCP field, the IP data packet to a sidelink bearer of a remote terminal corresponding to a value of the DSCP field, for transmission.

Optionally, there is a mapping relationship between the values of the DSCP field and the sidelink bearers; or there is a mapping relationship between the values of the DSCP field and attributes of the sidelink bearers. The mapping relationship described herein, or referred to as a mapping principle, may be configured by the network device, or determined by the relay terminal. Specifically, for example, a value 1 of the DSCP field corresponds to a UM bearer and a priority level n1; a value 2 of the DSCP field corresponds to a UM bearer and a priority level n2; a value 3 of the DSCP field corresponds to an AM bearer and a priority level n3; and a value 4 of the DSCP field corresponds to an AM bearer and a priority level n4. Alternatively, a service data delay (Packet Delay Budget, PDB) value corresponding to the value 1 of the DSCP field satisfies a condition A1, a block error rate satisfies a condition B1, a priority satisfies a condition C1, and the like. A service PDB value corresponding to the value 2 of the DSCP field satisfies a condition A2, a block error rate satisfies a condition B2, a priority satisfies a condition C2, and the like.

Solution 2: distinguishing by using a field newly added to a Uu PDU

The SLRB pipeline is per remote terminal, with a relatively fine granularity. The Uu DRB pipeline may contain SLRBs of a plurality of remote terminals or a plurality of SLRBs of one remote terminal, and is a relatively thick pipeline. Then, in the thick pipeline of the Uu DRB, different remote terminals or even different SLRBs may be distinguished by using a carried distinguishing identifier in the following manners.

Manner 1: A terminal identifier (UE ID) is configured in the Uu DRB to distinguish different remote terminals. A correspondence between UE IDs and remote terminals may be configured in advance, one remote terminal corresponds to one UE ID (or may correspond to plurality of UE IDs), and UE IDs of different remote terminals are different. In this way, during sending of the data of the remote terminal to the network device through the relay terminal (uplink), the data packet carries a UE ID, and after obtained the UE ID through parsing, the network device knows which remote terminal the data belongs to, and then sends the data to a corresponding entity for processing. For downlink, the network device carries a UE ID when sending data on the Uu DRB to the relay terminal. In this way, after receiving the data, the relay terminal can find a corresponding remote terminal based on the UE ID, and adds the data to an SLRB of the corresponding remote terminal, and sends the data to the remote terminal.

Based on description of manner 1, it can be learned that the Uu bearer includes a plurality of terminal identifiers, and the plurality of terminal identifiers are used to identify a plurality of different remote terminals. In this way, the embodiment 100 may further include the following step: based on the terminal identifier in the Uu bearer, mapping a data packet transmitted on the Uu bearer to a sidelink bearer of a corresponding remote terminal, for transmission.

Manner 2: A sidelink bearer index (for example, an SLRB index) is configured for a data packet transmitted on the Uu bearer to distinguish sidelink bearers (for example, an SLRB bearer or an RLC bearer) of different remote terminals, and/or, to distinguish sidelink bearers (for example, an SLRB bearer or an RLC bearer) of one remote terminal.

In an example, a configuration relationship between SLRB indexes and SLRBs of remote terminals is configured in advance by using RRC signaling, for example, an index corresponding to an SLRB 1 of a remote UE 1 is 0, an index corresponding to an SLRB 1 of a remote UE 2 is 1, and an index corresponding to an SLRB 1 of a remote UE 3 is 2. In this case, the SLRBs of the remote terminals can be distinguished by different indexes.

Manner 3: A QoS flow index is configured for a data packet transmitted on the Uu bearer, and the QoS flow index is used to distinguish one of the following: a plurality of pieces of QoS flow information of a plurality of remote terminals and different QoS flow information of one remote terminal.

Based on descriptions of the manner 2 and manner 3, the embodiment 100 may further include at least one of the following:

based on the sidelink bearer index in the Uu bearer, mapping the data packet transmitted on the Uu bearer to a sidelink bearer of a remote terminal corresponding to the sidelink bearer index, for transmission; or based on the QoS flow index in the Uu bearer, mapping the data packet transmitted on the Uu bearer to a sidelink bearer of a remote terminal corresponding to the QoS flow index, for transmission.

(1) Optionally, in the foregoing embodiments, the network device may further determine a bearer configuration for a service of the remote terminal on the sidelink interface, for example, an SLRB configuration, an SDAP configuration, a PDCP configuration, an RLC configuration, a MAC configuration, and a PHY configuration, so as to map QoS flow information with similar QoS requirements of the remote terminal to one SLRB and also provide configurations of other layers.

In the L2 relay architecture, the network device may directly send the configurations of the SLRB and other layers of the remote terminal to the remote terminal by using RRC signaling.

In the L3 relay architecture, generally, no RRC connection is established between the remote terminal and the network device. Therefore, the network device may send the configurations related to the remote terminal to the relay terminal by using RRC signaling, and then the relay terminal sends the configurations to the remote terminal by using PC5 RRC.

In the L3 relay architecture, a configuration may alternatively be obtained based on a status of the remote terminal. If the remote terminal is in an idle/inactive state, an SLRB configuration corresponding to QoS of a service is obtained from a SIB message; if the remote terminal is in an offline state, an SLRB configuration corresponding to QoS of a service is obtained from preconfigured information; or if the remote terminal is in a connected state, a configuration is obtained from a serving cell by using an RRC signaling procedure. The serving cell described herein may be the same as or different from a serving cell of the relay terminal, or may even belong to a different network device.

(2) Optionally, in the foregoing embodiments, the network device may alternatively configure a corresponding sidelink bearer configuration for the relay terminal, so as to map QoS flow information with similar QoS requirements of the remote terminal to one SLRB and also provide configurations of other layers. These configurations are configured for transmission of services of the remote terminal on the PC5 link, which is equivalent that the remote terminal and the relay terminal are two ends of the PC5 link for communication. Corresponding configurations to be used cooperatively are required for service transmission in both directions.

In the L2 architecture, the remote terminal and the relay terminal obtain their own PC5 link configurations by performing the foregoing "(1)" step and "(2)" step, respectively, and the configurations match each other, corresponding to two ends of one SLRB, which can be used cooperatively. In the L3 architecture, based on the "(2)" step, the relay terminal first obtains a PC5 link configuration by using an RRC procedure, and then sends, to the remote terminal by using PC5 RRC, a configuration that needs to be sent to the remote terminal. In this way, two steps are also performed to cause terminal devices (that is, the remote terminal and the relay terminal) at both ends of the PC5 link to obtain related configurations to be used cooperatively.

In order to describe in detail the configuration method for the sidelink relay architecture provided in this embodiment of this application, the following provides description with reference to several specific embodiments.

Embodiment 1

In the L2 relay architecture, the remote terminal needs to establish its own RRC connection and non-access stratum (NAS) connection. The serving cell of the remote terminal may be the same as or different from the serving cell of the relay terminal, both belonging to a same network device.

Procedure 1

For configuration and mapping of the remote terminal on the PC5 link, the remote terminal may report its own QoS information by using RRC signaling, for example, using sidelink UE information for reporting, carrying a special relay architecture transmission indication; or using special signaling for reporting QoS information of transmission on the relay architecture. The network side sends, to the remote UE by using RRC reconfiguration signaling, a PC5 link configuration and a mapping relationship between the QoS flow information and the SLRB.

For configuration and mapping of the relay terminal on the PC5 link, the relay terminal may perform reporting and obtain a configuration from the network side, requiring only an additional indication indicating a service of the relay architecture.

For the configuration of the Uu link and the mapping relationship described in the embodiment 100, the remote terminal may interact with the core network by using an NAS message, and the core network then instructs the network device to perform acceptance and configuration, so as to trigger the network device to configure a bearer of the Uu link.

Because the configurations of the PC5 link of the remote terminal and the relay terminal are determined and delivered by the same network device, the network device can determine the mapping relationship between the sidelink bearer and/or QoS flow information of the PC5 link and the Uu bearer during Uu link configuration, and sends the mapping relationship to the relay terminal.

After all configurations are completed, the remote terminal may perform its own data transmission by using two-bearer configurations and mappings of the PC5 link and the Uu link. The mapping between the sidelink bearer and/or QoS flow information and the Uu bearer is performed by the relay terminal according to the configuration of the network device.

Procedure 2

For a remote terminal, its services of the relay architecture are all ultimately transmitted to the network device side, and therefore all related Uu link and PC5 link configurations can be implemented after interaction is performed between the remote terminal and the network device by using a NAS procedure.

That is, after the remote terminal and the core network exchange service requirements, the core network agrees to the relay service request, and a core network node, such as an AMF, sends a relay service establishment request to the network device. The request is for configuring three types of content: 1. PC5 link configuration of the remote UE; 2. PC5 link configuration of the relay UE; and 3. Uu link related configurations of the relay UE and the mapping relationship described in the embodiment 100. Certainly, a QoS flow index/sidelink bearer index/UE ID may be further configured to distinguish different remote terminals or different SLRBs. Because the three types of content are determined by the network device, the network device ensures consistency of the configurations. After obtaining the configurations, each node operates according to the configurations.

Procedure 3

The PC5 link configuration of the remote terminal is triggered by its own RRC signaling reporting procedure; the Uu link configuration and PC5 link configuration of the relay terminal are triggered by a service establishment request sent by the core network to the network device after a NAS procedure of the relay terminal is performed. For a specific process, refer to Procedure 2.

Embodiment 2

On a basis of the foregoing embodiments, Embodiment 2 provides some typical procedures under the L3 relay architecture. In the L3 relay architecture, the remote terminal generally does not have its own RRC connection and NAS connection.

Service information and requirements of the remote terminal are sent to the relay terminal by using PC5-S or PC5 RRC. The relay terminal reports the service information and requirements to the network device through its own RRC connection, and interacts with the core network through an NAS connection of the relay terminal, for example, PDU session establishment. During such reporting, the relay terminal may add a special relay indication identifier or even a remote terminal identifier, indicating that this is different from its own service, and then the relay architecture needs to be considered during network configuration.

Procedure 1

The remote terminal obtains the PC5 link configuration from a SIB, preconfigured information, or its own RRC (not related to a current service), and sends the configuration to the relay UE by using PC5 RRC.

The relay terminal reports service information of the remote terminal and/or the PC5 link configuration, SLRB configuration, and the like of the remote terminal to the network device, and the network device configures the PC5 link configuration for the relay terminal.

The relay terminal requests, by using its own NAS procedure, the core network for service transmission for the remote terminal, and upon agreement by the core network, requests acceptance and configuration from the network device. In this case, the network device provides, for the relay terminal, the Uu link configuration and the mapping relationship described in the embodiment 100.

Procedure 2

The relay terminal requests, by using its own NAS procedure, the core network for service transmission for the remote terminal, and upon agreement by the core network, requests acceptance and configuration from the network device. In this case, the base station provides the following three configurations: 1. PC5 link configuration of the remote terminal, which is sent to the relay terminal by using RRC, and then sent to the remote terminal by the relay terminal by using the PC5 RRC; 2. PC5 link configuration of the relay terminal, which is sent to the relay terminal by using RRC signaling; 3. Uu link related configurations of the relay terminal and the mapping relationship described in the embodiment 100. Certainly, a QoS flow index/sidelink bearer index/UE ID may be further configured to distinguish different remote terminals or different SLRBs. Because the three types of content are determined by the network device, the network device ensures consistency of the configurations. After obtaining the configurations, each node operates according to the configurations.

Procedure 3

The PC5 link configuration of the remote terminal and the PC5 link configuration of the relay terminal are triggered by an RRC signaling reporting procedure of the relay terminal. The configuration of the remote terminal is first sent to the relay terminal, and then sent to the remote terminal by the relay terminal by using PC5 RRC.

The Uu link configuration of the relay terminal and the mapping relationship described in the embodiment 100 are triggered by a relay service establishment request sent by the core network to the network device, after the NAS procedure of the relay terminal is performed.

The foregoing describes in detail the configuration method for the sidelink relay architecture in this embodiment of this application with reference to FIG. 1. The following describes in detail a configuration method for a sidelink relay architecture according to another embodiment of this application with reference to FIG. 3. It can be understood that interaction between the network device and the relay terminal described from the network device side is the same as the description on the relay terminal device side in the foregoing embodiment. To avoid repetition, related descriptions are appropriately omitted.

FIG. 3 is a schematic implementation flowchart of a configuration method for a sidelink relay architecture according to an embodiment of this application. The method may be applied to a network device side. As shown in FIG. 3, the method 300 includes the following step.

S302: Send configuration information, where the configuration information is used for configuring, for a relay terminal, a mapping relationship between a Uu bearer and at least one of the following of a remote terminal: a sidelink bearer or QoS flow information, and the Uu bearer is a bearer between the relay terminal and a network device.

In this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

Optionally, in an embodiment, the Uu bearer includes a Uu DRB or a Uu RLC bearer; and the sidelink bearer includes an SLRB or a sidelink RLC bearer.

Optionally, in an embodiment, before the sending configuration information, the method further includes: receiving QoS information from the relay terminal, where the QoS information is sent by the remote terminal to the relay terminal; and configuring the Uu bearer for the relay terminal based on the QoS information.

Optionally, in an embodiment, the QoS information is carried by newly defined RRC signaling, and the newly defined RRC signaling is used to indicate that the QoS information corresponds to a service of the remote terminal; or the QoS information is carried by existing RRC signaling, the existing RRC signaling includes indication information, and the indication information is used to indicate that the QoS information corresponds to a service of the remote terminal.

Optionally, in an embodiment, before the sending configuration information, the method further includes: receiving sidelink bearer information from the relay terminal, where the sidelink bearer information is sent by the remote terminal to the relay terminal; and configuring the Uu bearer for the relay terminal based on the sidelink bearer information.

Optionally, in an embodiment, in a case that the configuration information is used for configuring a mapping relationship between the sidelink bearer and the Uu bearer, N sidelink bearers are mapped to one Uu bearer, where N is an integer greater than or equal to 1; and/or in a case that the configuration information is used for configuring a mapping relationship between the QoS flow information and the Uu bearer, M pieces of QoS flow information are mapped to one Uu bearer, where M is an integer greater than or equal to 1.

Optionally, in an embodiment, an IP data packet transmitted on the Uu bearer includes an IP address, and there is a correspondence between the IP address and the remote terminal.

Optionally, in an embodiment, an IP data packet transmitted on the Uu bearer includes a DSCP field, and a plurality of values of the DSCP field correspond to a plurality of pieces of data with different QoS information respectively, and the plurality of pieces of data with different QoS information belong to one or more remote terminals.

Optionally, in an embodiment, the Uu bearer includes a plurality of terminal identifiers, and the plurality of terminal identifiers are used to identify a plurality of different remote terminals.

Optionally, in an embodiment, in a case that N is greater than 1, a data packet transmitted on the Uu bearer includes a sidelink bearer index, and the sidelink bearer index is used to distinguish one of the following: a plurality of sidelink bearers of a plurality of remote terminals and different sidelink bearers of one remote terminal; and/or in a case that M is greater than 1, a data packet transmitted on the Uu bearer includes a QoS flow index, and the QoS flow index is used to distinguish one of the following: a plurality of pieces of QoS flow information of a plurality of remote terminals and different QoS flow information of one remote terminal.

The following describes in detail a configuration method for a sidelink relay architecture according to another embodiment of this application with reference to FIG. 4. It can be understood that interaction between the remote terminal and the relay terminal described from the remote terminal side is the same as the description on the relay terminal device side in the foregoing embodiment. To avoid repetition, related descriptions are appropriately omitted.

FIG. 4 is a schematic implementation flowchart of a configuration method for a sidelink relay architecture according to an embodiment of this application. The method may be applied to a remote terminal side. As shown in FIG. 4, the method 400 includes the following step.

S402: Send QoS information, where the QoS information is used for configuring, for a relay terminal by a network device, a mapping relationship between a Uu bearer and at least one of the following: a sidelink bearer or QoS flow information, and the Uu bearer is a bearer between the relay terminal and the network device.

In this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

Optionally, in an embodiment, the sending QoS information includes at least one of the following:

(1) sending the QoS information to the relay terminal, where the relay terminal is further configured to send the QoS information to the network device;

(2) sending the QoS information to the network device; or (3) sending the QoS information to a core-network device during a signaling process with a non-access stratum NAS of the core-network device, where the core-network device is further configured to send the QoS information to the network device.

Optionally, in an embodiment, the QoS information includes at least one of the following: (1) relay indication information, where the relay indication information indicates that a service of the remote terminal is to be transmitted through a relay architecture; or (2) identification information of the relay terminal.

The network device may first obtain service requirement information of the remote terminal, and then configures a correct bearer and a correct mapping for data of the remote terminal. The service requirement information may be obtained by using the following methods.

Method 1: The remote terminal reports service QoS information to a serving network device.

This method is more applicable to remote terminals being in a connected state. For example, the remote terminal is connected to the network device side through the L2 relay architecture, or the remote terminal has a direct RRC connection to a serving node. In this case, the remote terminal may report, to the network device by using an RRC message, QoS information of a service to be performed by the remote terminal. For example, sidelink UE information is used for reporting, including detailed QoS list information. An explicit relay indication may also be carried, indicating that the service needs to be transmitted to the network device side through the relay architecture and requires differentiated processing due to being different from an ordinary PC5 service.

In this process, information of the relay terminal may alternatively be reported explicitly or implicitly, so that the network device side performs related configuration on the relay terminal. Being explicit may mean carrying identification information of the relay terminal explicitly; and being implicit means that, because RRC signaling of the remote terminal may be sent through the Uu bearer of the relay terminal, the network side is able to learn about a corresponding relay terminal after receiving the RRC signaling, so as to provide configurations to the relay terminal for serving the remote terminal.

Method 2: The remote terminal performs interaction of service QoS information with the core network by using the NAS procedure, and the core network sends the service QoS information to a serving network device (base station).

This method means that the remote terminal reports the QoS information to the core network node, such as the AMF, by using its own NAS procedure, where a relay indication may be explicitly carried, indicating that the service needs to be transmitted to the network side through the relay architecture, and an identifier of the relay terminal may also be carried, so that the core network performs association processing on the remote terminal and the relay terminal.

After the core network node performs basic verification and policy processing to determine to establish a requested relay service for the remote terminal, the core network node sends a service request to the base station through an interface between the core network node and the base station, carrying the QoS information of the remote terminal and the relay indication, as well as possibly the identifier of the relay terminal, so as to request the base station to establish a corresponding bearer for the service.

Method 3: The relay terminal reports service QoS information of the remote terminal to a serving network device (base station).

Method 4: The relay terminal reports PC5 service bearer information of the remote terminal to a serving network device (base station).

Method 3 and method 4 have been described above, and details are not repeated herein.

The foregoing describes in detail the configuration method for the sidelink relay architecture in the embodiments of this application with reference to FIG. 1 to FIG. 4. The following describes in detail a terminal device according to an embodiment of this application with reference to FIG. 5.

FIG. 5 is a schematic structural diagram of a terminal device according to an embodiment of this application. As shown in FIG. 5, the terminal device 500 (corresponding to the relay terminal in the foregoing embodiments) includes:

a receiving module 502, configured to receive configuration information, where the configuration information is used for configuring a mapping relationship between a Uu bearer and at least one of the following of a remote terminal: a sidelink bearer or QoS flow information, and the Uu bearer is a bearer between the terminal device 500 and a network device.

In this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

Optionally, in an embodiment, the Uu bearer includes a Uu dedicated radio bearer DRB or a Uu radio link control RLC bearer; and the sidelink bearer includes a sidelink radio bearer SLRB or a sidelink RLC bearer.

Optionally, in an embodiment, the terminal device 500 further includes a sending module, where the receiving module 502 may be further configured to receive QoS information from the remote terminal; and the sending module is configured to send the QoS information to the network device, where the QoS information is used for configuring the Uu bearer for the relay terminal by the network device.

Optionally, in an embodiment, the sending module is configured to:

send the QoS information to the network device by using newly defined radio resource control RRC signaling, where the newly defined RRC signaling is used to indicate that the QoS information corresponds to a service of the remote terminal; or send the QoS information to the network device by using existing RRC signaling, where the existing RRC signaling includes indication information, and the indication information is used to indicate that the QoS information corresponds to a service of the remote terminal.

Optionally, in an embodiment, the terminal device 500 further includes a sending module, where the receiving module may be further configured to receive sidelink bearer information from the remote terminal; and the sending module is configured to send the sidelink bearer information to the network device, where the sidelink bearer information is used for configuring the Uu bearer for the relay terminal by the network device.

Optionally, in an embodiment, in a case that the configuration information is used for configuring a mapping relationship between the sidelink bearer and the Uu bearer, N sidelink bearers are mapped to one Uu bearer, where N is an integer greater than or equal to 1; and/or in a case that the configuration information is used for configuring a mapping relationship between the QoS flow information and the Uu bearer, M pieces of QoS flow information are mapped to one Uu bearer, where M is an integer greater than or equal to 1.

Optionally, in an embodiment, an IP data packet transmitted on the Uu bearer includes an IP address, and there is a correspondence between the IP address and the remote terminal.

Optionally, in an embodiment, the terminal device 500 further includes a sending module, configured to map, based on the IP address, the IP data packet transmitted on the Uu bearer to a sidelink bearer of a remote terminal corresponding to the IP address, for transmission.

Optionally, in an embodiment, an IP data packet transmitted on the Uu bearer includes a differentiated services code point DSCP field, and a plurality of values of the DSCP field correspond to a plurality of pieces of data with different QoS information respectively, and the plurality of pieces of data with different QoS information belong to one or more remote terminals.

Optionally, in an embodiment, the terminal device 500 further includes a sending module, configured to map, based on a value of the DSCP field, the IP data packet to a sidelink bearer of a remote terminal corresponding to the value of the DSCP field, for transmission.

Optionally, in an embodiment, there is a mapping relationship between the values of the DSCP field and the sidelink bearers; or there is a mapping relationship between the values of the DSCP field and attributes of the sidelink bearers.

Optionally, in an embodiment, the Uu bearer includes a plurality of terminal identifiers, and the plurality of terminal identifiers are used to identify a plurality of different remote terminals.

Optionally, in an embodiment, the terminal device 500 further includes a sending module, configured to map, based on the terminal identifier, a data packet transmitted on the Uu bearer to a sidelink bearer of a corresponding remote terminal, for transmission.

Optionally, in an embodiment, in a case that N is greater than 1, a data packet transmitted on the Uu bearer includes a sidelink bearer index, and the sidelink bearer index is used to distinguish one of the following: a plurality of sidelink bearers of a plurality of remote terminals and different sidelink bearers of one remote terminal; and/or in a case that M is greater than 1, a data packet transmitted on the Uu bearer includes a QoS flow index, and the QoS flow index is used to distinguish one of the following: a plurality of pieces of QoS flow information of a plurality of remote terminals and different QoS flow information of one remote terminal.

Optionally, in an embodiment, the terminal device 500 further includes a sending module, configured to:

based on the sidelink bearer index, map the data packet transmitted on the Uu bearer to a sidelink bearer of a remote terminal corresponding to the sidelink bearer index, for transmission; and based on the QoS flow index, map the data packet transmitted on the Uu bearer to a sidelink bearer of a remote terminal corresponding to the QoS flow index, for transmission.

For the terminal device 500 in this embodiment of this application, refer to the processes of the method 100 in the corresponding embodiment of this application, and the units or modules of the terminal device 500 and other operations and/or functions described above are used to implement the corresponding processes in the method 100, with the same or equivalent technical effects achieved. For brevity, details are not repeated herein.

FIG. 6 is a schematic structural diagram of a terminal device according to an embodiment of this application. As shown in FIG. 6, the terminal device 600 (corresponding to the remote terminal in the foregoing embodiments) includes:

a sending module 602, configured to send QoS information, where the QoS information is used for configuring, for a relay terminal by a network device, a mapping relationship between a Uu bearer and at least one of the following: a sidelink bearer or QoS flow information, and the Uu bearer is a bearer between the relay terminal and a network device.

In this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

Optionally, in an embodiment, the sending module 602 may be configured for at least one of the following:

(1) sending the QoS information to the relay terminal, where the relay terminal is further configured to send the QoS information to the network device;

(2) sending the QoS information to the network device; or (3) sending the QoS information to a core-network device during a signaling process with a non-access stratum NAS of the core-network device, where the core-network device is further configured to send the QoS information to the network device.

Optionally, in an embodiment, the QoS information includes at least one of the following: (1) relay indication information, where the relay indication information indicates that a service of the remote terminal is to be transmitted through a relay architecture; or (2) identification information of the relay terminal.

For the terminal device 600 in this embodiment of this application, refer to the processes of the method 400 in the corresponding embodiment of this application, and the units or modules of the terminal device 600 and other operations and/or functions described above are used to implement the corresponding processes in the method 400, with the same or equivalent technical effects achieved. For brevity, details are not repeated herein.

FIG. 7 is a schematic structural diagram of a network device according to an embodiment of this application. As shown in FIG. 7, the network device 700 includes:

a sending module 702, configured to send configuration information, where the configuration information is used for configuring, for a relay terminal, a mapping relationship between a Uu bearer and at least one of the following of a remote terminal: a sidelink bearer or QoS flow information, and the Uu bearer is a bearer between the relay terminal and the network device.

In this embodiment of this application, the network device may configure, for the relay terminal, the mapping relationship between the sidelink bearer and/or QoS flow information and the Uu bearer, so that the relay terminal can serve the remote terminal to meet QoS requirements of a service, thereby improving system performance and user experience.

Optionally, in an embodiment, the Uu bearer includes a Uu DRB or a Uu RLC bearer; and the sidelink bearer includes an SLRB or a sidelink RLC bearer.

Optionally, in an embodiment, the network device 700 includes a receiving module, configured to receive QoS information from the relay terminal, where the QoS information is sent by the remote terminal to the relay terminal; and the sending module 702 is configured to configure the Uu bearer for the relay terminal based on the QoS information.

Optionally, in an embodiment, the QoS information is carried by newly defined RRC signaling, and the newly defined RRC signaling is used to indicate that the QoS information corresponds to a service of the remote terminal; or the QoS information is carried by existing RRC signaling, the existing RRC signaling includes indication information, and the indication information is used to indicate that the QoS information corresponds to a service of the remote terminal.

Optionally, in an embodiment, the network device 700 includes a receiving module, configured to receive sidelink bearer information from the relay terminal, where the sidelink bearer information is sent by the remote terminal to the relay terminal; and the sending module 702 is configured to configure the Uu bearer for the relay terminal based on the sidelink bearer information.

Optionally, in an embodiment, in a case that the configuration information is used for configuring a mapping relationship between the sidelink bearer and the Uu bearer, N sidelink bearers are mapped to one Uu bearer, where N is an integer greater than or equal to 1; and/or in a case that the configuration information is used for configuring a mapping relationship between the QoS flow information and the Uu bearer, M pieces of QoS flow information are mapped to one Uu bearer, where M is an integer greater than or equal to 1.

Optionally, in an embodiment, an IP data packet transmitted on the Uu bearer includes an IP address, and there is a correspondence between the IP address and the remote terminal.

Optionally, in an embodiment, an IP data packet transmitted on the Uu bearer includes a DSCP field, and a plurality of values of the DSCP field correspond to a plurality of pieces of data with different QoS information respectively, and the plurality of pieces of data with different QoS information belong to one or more remote terminals.

Optionally, in an embodiment, the Uu bearer includes a plurality of terminal identifiers, and the plurality of terminal identifiers are used to identify a plurality of different remote terminals.

Optionally, in an embodiment, in a case that N is greater than 1, a data packet transmitted on the Uu bearer includes a sidelink bearer index, and the sidelink bearer index is used to distinguish one of the following: a plurality of sidelink bearers of a plurality of remote terminals and different sidelink bearers of one remote terminal; and/or in a case that M is greater than 1, a data packet transmitted on the Uu bearer includes a QoS flow index, and the QoS flow index is used to distinguish one of the following: a plurality of pieces of QoS flow information of a plurality of remote terminals and different QoS flow information of one remote terminal.

For the network device 700 in this embodiment of this application, refer to the processes of the method 300 in the corresponding embodiment of this application, and the units or modules of the network device 700 and other operations and/or functions described above are used to implement the corresponding processes in the method 300, with the same or equivalent technical effects achieved. For brevity, details are not repeated herein.

All the embodiments in this specification are described in a progressive manner. Each embodiment focuses on differences from other embodiments. For the part that is the same or similar between different embodiments, reference may be made between the embodiments. The device embodiment is essentially similar to the method embodiment, and therefore is described briefly. For related information, refer to descriptions of the related parts in the method embodiment.

In a case that an indefinite or definite article (for example, "a," "an", or "the") is used for indicating a singular noun, the singular noun includes plurality of the noun unless otherwise specified.

Furthermore, the terms "first", "second", "third", and the like are used in the specification and claims to distinguish between similar elements, and these terms do not necessarily describe a sequence or chronological order. It should be understood that the terms so used are interchangeable under appropriate circumstances and that the implementation solutions of this application described in this specification can be executed in other orders than those described or illustrated herein.

Figure 8:
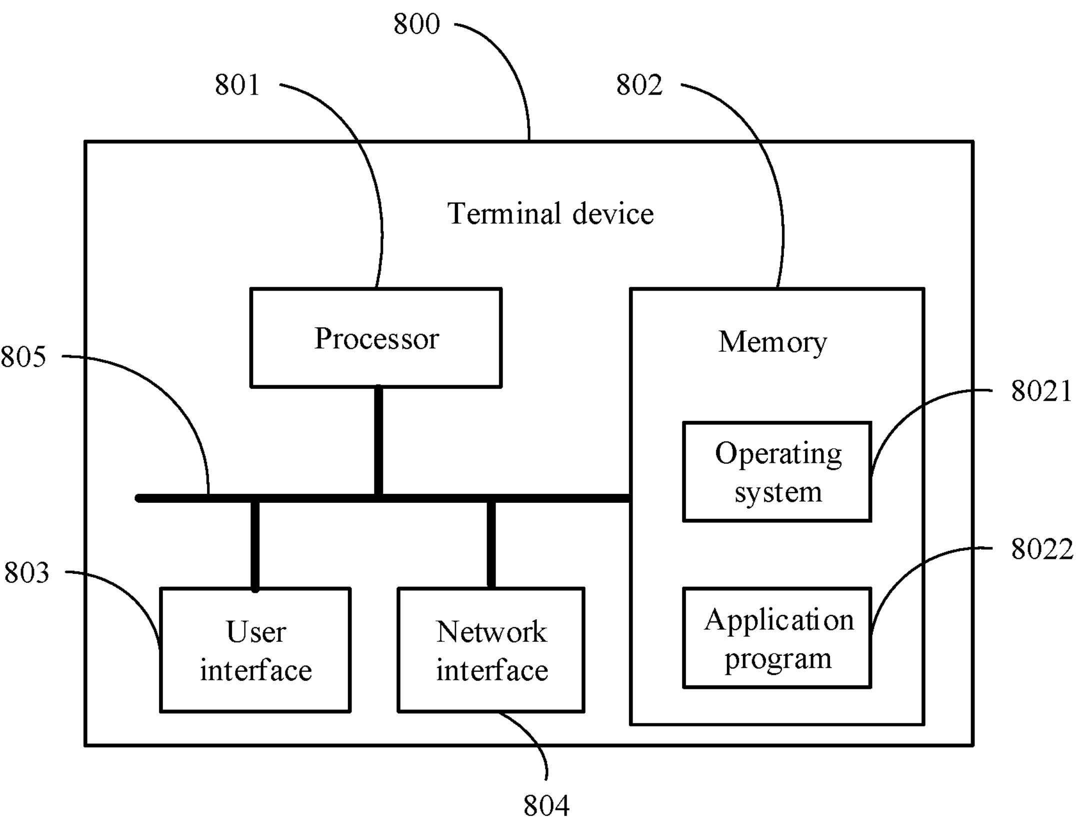
FIG. 8 is a schematic structural diagram of a terminal device according to still another embodiment of this application.

FIG. 8 is a block diagram of a terminal device according to another embodiment of this application. The terminal device 800 shown in FIG. 8 includes at least one processor 801, a memory 802, at least one network interface 804, and a user interface 803. The components of the terminal device 800 are coupled together by using a bus system 805. It can be understood that the bus system 805 is configured to implement connection communication between these components. The bus system 805 may include not only a data bus but also a power supply bus, a control bus, and a status signal bus. However, for clarity of description, various types of buses in FIG. 8 are marked as the bus system 805.

The user interface 803 may include a display, a keyboard, a click device (for example, a mouse or a trackball), a touch board, or a touchscreen.

It can be understood that the memory 802 in this embodiment of this application may be a volatile memory or a non-volatile memory, or may include both a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), and the RAM is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 802 in the system and method described in the embodiments of this application is intended to include but is not limited to these and any other suitable types of memories.

In some implementations, the memory 802 stores the following elements: an executable module or a data structure, or a subset thereof, or an extended set thereof: an operating system 8021 and an application program 8022.

An operating system 8021 includes various system programs, such as a framework layer, a kernel library layer, and a driver layer, and is configured to implement various basic services and process hardware-based tasks. The application program 8022 includes various application programs, such as a media player and a browser, and is configured to implement various application services. A program that implements the methods of the embodiments of this disclosure may be included in the application program 8022.

In this embodiment of this application, the terminal device 800 further includes an instruction or a program stored in the memory 802 and capable of running on the processor 801. When the instruction or the program is executed by the processor 801, the steps of the foregoing method embodiments 100 and 400 are implemented.

The methods disclosed in the embodiments of this application may be applied to the processor 801, or implemented by the processor 801. The processor 801 may be an integrated circuit chip with a signal processing capability. In an implementation process, the steps in the foregoing method may be implemented by using a hardware integrated logic circuit in the processor 801, or by using instructions in a form of software. The foregoing processor 801 may be a general processor, a digital signal processor (DSP), an application-specific integrated circuit (ASIC), a field programmable gate array (FPGA) or another programmable logic device, a discrete gate or transistor logic device, or a discrete hardware component; and may implement or execute methods, steps, and logical block diagrams disclosed in the embodiments of this application. The general-purpose processor may be a microprocessor or any regular processor. The steps of the methods disclosed with reference to the embodiments of the application may be directly implemented by a hardware decoding processor, or may be implemented by a combination of hardware and a software module in a decoding processor. The software module may be located in a readable storage medium that is mature in the art, such as a random access memory, a flash memory, a read-only memory, a programmable read-only memory, or an electrically erasable programmable memory, or a register. The readable storage medium is located in the memory 802, and the processor 801 reads information in the memory 802 and implements, in combination with its hardware, the steps of the foregoing methods. Specifically, the readable storage medium stores an instruction or a program, and when the instruction or the program is executed by the processor 801, the steps of the foregoing method embodiments 100 and 400 are implemented.

It can be understood that the embodiments described in this application may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the techniques described in the embodiments of this application may be implemented by modules (such as processes and functions) that perform the functions described in the embodiments of this application. Software code may be stored in the memory and executed by the processor. The memory may be implemented in or outside the processor.

The terminal device 800 is capable of implementing the processes that are implemented by the terminal device in the foregoing embodiments, with the same or equivalent technical effects achieved. To avoid repetition, details are not described herein again.

Figure 9:
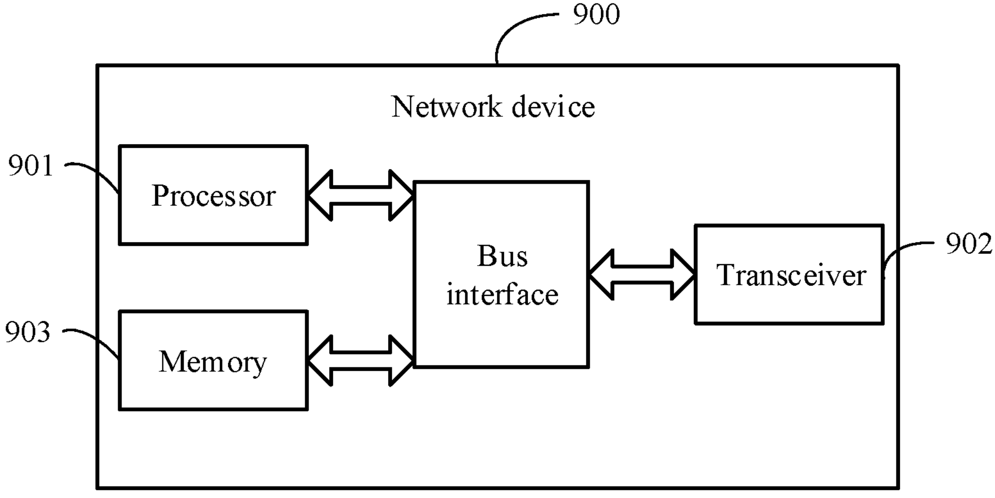
FIG. 9 is a schematic structural diagram of a network device according to another embodiment of this application.

Referring to FIG. 9, FIG. 9 is a structural diagram of a network device to which the embodiments of this application are applied. Details of the method embodiment 300 can be implemented to achieve the same effects. As shown in FIG. 9, the network device 900 includes a processor 901, a transceiver 902, a memory 903, and a bus interface.

In this embodiment of this application, the network device 900 further includes an instruction or a program stored in the memory 903 and capable of running on the processor 901. When the instruction or the program is executed by the processor 901, the steps of the method embodiment 300 are implemented.

In FIG. 9, a bus architecture may include any quantity of interconnected buses and bridges, specifically for interconnecting various circuits of one or more processors represented by the processor 901 and a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, that is, the transceiver 902 includes a transmitter and a receiver, and provides a unit for communicating with various other apparatuses on a transmission medium.

The processor 901 is responsible for bus architecture management and general processing. The memory 903 may store data used when the processor 901 performs an operation.

An embodiment of this application further provides a readable storage medium, where the readable storage medium stores a program or an instruction. When the program or the instruction is executed by a processor, the processes of any one of the foregoing method embodiment 100 to the foregoing method embodiment 400 are implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction to implement the processes of any one of the foregoing method embodiment 100 to the foregoing method embodiment 400, with the same technical effects achieved. To avoid repetition, details are not described herein again.

It should be understood that the chip described in the embodiments of this application may also be referred to as a system-level chip, a system chip, a chip system, a system-on-chip, or the like.

It should be understood that the chip described in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A configuration method for a sidelink relay architecture, wherein the method is performed by a relay terminal, and the method comprises:

receiving configuration information, wherein the configuration information is used for configuring a mapping relationship between a universal user network interface (Uu) bearer and quality of service (QoS) flow information of a remote terminal, and the Uu bearer is a bearer between the relay terminal and a network device;

wherein a data packet transmitted on the Uu bearer comprises a QoS flow index, and the QoS flow index is used to distinguish one of the following: a plurality of pieces of QoS flow information of a plurality of remote terminals; and different pieces of QoS flow information of one remote terminal;

wherein the method further comprises:

based on the QoS flow index in the Uu bearer, mapping the data packet transmitted on the Uu bearer to a sidelink bearer of a remote terminal corresponding to the QoS flow index, for transmission;

wherein before the receiving configuration information, the method further comprises:

receiving QoS information from the remote terminal; and sending the QoS information to the network device, wherein the QoS information is used for configuring the Uu bearer for the relay terminal by the network device;

or wherein the configuration information is further used for configuring a mapping relationship between the Uu bearer and a sidelink bearer of the remote terminal, and before the receiving configuration information, the method further comprises:

receiving sidelink bearer information from the remote terminal; and sending the sidelink bearer information to the network device, wherein the sidelink bearer information is used for configuring the Uu bearer for the relay terminal by the network device.

2. The method according to claim 1, wherein the configuration information is further used for configuring a mapping relationship between the Uu bearer and a sidelink bearer of the remote terminal;

the Uu bearer comprises a Uu dedicated radio bearer (DRB) or a Uu radio link control (RLC) bearer; and the sidelink bearer comprises a sidelink radio bearer (SLRB) or a sidelink RLC bearer.

3. The method according to claim 1, wherein the sending the QoS information to the network device comprises:

sending the QoS information to the network device by using newly defined radio resource control (RRC) signaling, wherein the newly defined RRC signaling is used to indicate that the QoS information corresponds to a service of the remote terminal; or sending the QoS information to the network device by using existing RRC signaling, wherein the existing RRC signaling comprises indication information, and the indication information is used to indicate that the QoS information corresponds to a service of the remote terminal.

4. The method according to claim 1, wherein the configuration information is further used for configuring a mapping relationship between the Uu bearer and a sidelink bearer of the remote terminal, and N sidelink bearers are mapped to one Uu bearer, wherein N is an integer greater than 1.

5. The method according to claim 4, wherein an IP data packet transmitted on the Uu bearer comprises an IP address, and there is a correspondence between the IP address and the remote terminal, and wherein after the receiving configuration information, the method further comprises:

based on the IP address, mapping the IP data packet transmitted on the Uu bearer to the sidelink bearer of the remote terminal corresponding to the IP address, for transmission.

6. The method according to claim 4, wherein an IP data packet transmitted on the Uu bearer comprises a differentiated services code point (DSCP) field, and a plurality of values of the DSCP field correspond to a plurality of pieces of data with different QoS information respectively, and the plurality of pieces of data with different QoS information belong to one or more remote terminals, and wherein after the receiving configuration information, the method further comprises:

based on a value of the DSCP field, mapping the IP data packet to the sidelink bearer of the remote terminal corresponding to the value of the DSCP field, for transmission.

7. The method according to claim 6, wherein there is a mapping relationship between the value of the DSCP field and the sidelink bearer; and there is a mapping relationship between the value of the DSCP field and an attribute of the sidelink bearer.

8. The method according to claim 4, wherein the Uu bearer comprises a plurality of terminal identifiers, and the plurality of terminal identifiers are used to identify a plurality of different remote terminals, and wherein after the receiving configuration information, the method further comprises:

based on the terminal identifier, mapping a data packet transmitted on the Uu bearer to the sidelink bearer of a corresponding remote terminal, for transmission.

9. The method according to claim 4, wherein in a case that N is greater than 1, a data packet transmitted on the Uu bearer comprises a sidelink bearer index, and the sidelink bearer index is used to distinguish one of the following: a plurality of sidelink bearers of a plurality of remote terminals and different sidelink bearers of one remote terminal;

and wherein after the receiving configuration information, the method further comprises:

based on the sidelink bearer index, mapping the data packet transmitted on the Uu bearer to the sidelink bearer of the remote terminal corresponding to the sidelink bearer index, for transmission.

10. The method according to claim 1, wherein M pieces of QoS flow information are mapped to one Uu bearer, wherein M is an integer greater than 1.

11. A terminal device, comprising a memory, a processor, and an instruction stored in the memory and capable of running on the processor, wherein when the instruction is executed by the processor, the configuration method for the sidelink relay architecture according to claim 1 is implemented.

12. The terminal according to claim 11, wherein M pieces of QoS flow information are mapped to one Uu bearer, wherein M is an integer greater than 1.

13. A configuration method for a sidelink relay architecture, wherein the method is performed by a network device, and the method comprises:

sending configuration information, wherein the configuration information is used for configuring, for a relay terminal, a mapping relationship between a universal user network interface (Uu) bearer and quality of service (QoS) flow information of a remote terminal, and the Uu bearer is a bearer between the relay terminal and the network device;

wherein a data packet transmitted on the Uu bearer comprises a QoS flow index, and the QoS flow index is used to distinguish one of the following: a plurality of pieces of QoS flow information of a plurality of remote terminals; and different pieces of QoS flow information of one remote terminal;

wherein the QoS flow index in the Uu bearer is used to cause the relay terminal to map the data packet transmitted on the Uu bearer to a sidelink bearer of a remote terminal corresponding to the QoS flow index for transmission;

wherein before the sending configuration information, the method further comprises:

receiving QoS information from the relay terminal, wherein the QoS information is sent by the remote terminal to the relay terminal; and configuring the Uu bearer for the relay terminal based on the QoS information;

or wherein the configuration information is further used for configuring a mapping relationship between the Uu bearer and a sidelink bearer of the remote terminal, and before the sending configuration information, the method further comprises:

receiving sidelink bearer information from the relay terminal, wherein the sidelink bearer information is sent by the remote terminal to the relay terminal; and configuring the Uu bearer for the relay terminal based on the sidelink bearer information.

14. The method according to claim 13, wherein the configuration information is further used for configuring a mapping relationship between the Uu bearer and a sidelink bearer of the remote terminal;

the Uu bearer comprises a Uu dedicated radio bearer (DRB) or a Uu radio link control (RLC) bearer; and the sidelink bearer comprises a sidelink radio bearer (SLRB) or a sidelink RLC bearer.

15. The method according to claim 13, wherein the QoS information is carried by newly defined radio resource control (RRC) signaling, and the newly defined RRC signaling is used to indicate that the QoS information corresponds to a service of the remote terminal; or the QoS information is carried by existing RRC signaling, the existing RRC signaling comprises indication information, and the indication information is used to indicate that the QoS information corresponds to a service of the remote terminal.

16. The method according to claim 13, wherein the configuration information is further used for configuring a mapping relationship between the Uu bearer and a sidelink bearer of the remote terminal, and N sidelink bearers are mapped to one Uu bearer, wherein N is an integer greater than 1.

17. The method according to claim 16, wherein an IP data packet transmitted on the Uu bearer comprises an IP address, and there is a correspondence between the IP address and the remote terminal;

or wherein an IP data packet transmitted on the Uu bearer comprises a differentiated services code point (DSCP) field, and a plurality of values of the DSCP field correspond to a plurality of pieces of data with different QoS information respectively, and the plurality of pieces of data with different QoS information belong to one or more remote terminals;

or wherein the Uu bearer comprises a plurality of terminal identifiers, and the plurality of terminal identifiers are used to identify a plurality of different remote terminals;

or in a case that N is greater than 1, a data packet transmitted on the Uu bearer comprises a sidelink bearer index, and the sidelink bearer index is used to distinguish one of the following: a plurality of sidelink bearers of a plurality of remote terminals and different sidelink bearers of one remote terminal.

18. A network device, comprising a memory, a processor, and an instruction stored in the memory and capable of running on the processor, wherein when the instruction is executed by the processor, the configuration method for the sidelink relay architecture according to claim 13 is implemented.

* * * * *